United States Patent [19]
Arai et al.

[11] Patent Number: 4,662,467
[45] Date of Patent: May 5, 1987

[54] FRONT WHEEL SUSPENSION FOR A MOTOR VEHICLE WITH RIDING SADDLE

[75] Inventors: Shokichi Arai; Tadayoshi Fujii, both of Saitama, Japan

[73] Assignee: Honda Giken Kogyo Kabushiki Kaisha, Tokyo, Japan

[21] Appl. No.: 809,815

[22] Filed: Dec. 17, 1985

[30] Foreign Application Priority Data

Dec. 18, 1984 [JP] Japan ................................. 59-267049

[51] Int. Cl.$^4$ ........................ B62D 9/02; B62K 19/30
[52] U.S. Cl. .................................... 180/210; 280/282; 280/666; 280/781
[58] Field of Search ............... 280/688, 282, 781, 666; 180/210

[56] References Cited

U.S. PATENT DOCUMENTS

| | | | |
|---|---|---|---|
| 2,934,350 | 4/1960 | Herbenar | 280/666 |
| 4,158,397 | 6/1979 | Reynolds | 180/210 |
| 4,460,057 | 7/1984 | Kohyama | 180/210 |
| 4,547,997 | 10/1985 | Smyers | 180/210 |
| 4,600,216 | 7/1986 | Burkholder | 180/210 |

FOREIGN PATENT DOCUMENTS 59-267049  5/1984  Japan .

*Primary Examiner*—Richard A. Bertsch
*Attorney, Agent, or Firm*—Armstrong, Nikaido, Marmelstein & Kubovcik

[57] ABSTRACT

A front wheel suspension for a motor vehicle including a vehicle frame having a pair of upper frames which are spaced transversely and extend longitudinally and a pair of lower frames which are spaced transversely and extend longitudinally, each of the upper frames having a downward portion extending from a front portion thereof and having a lower end fixed to one of the lower frames, front and rear wheels rotatably disposed on front and rear portions of the vehicle frame, a rider's saddle disposed on the upper frames, and footsteps supported on the lower frames. The front wheel suspension comprises a subframe adapted to be attached to the vehicle frame and having a pair of extensions adapted to be disposed upwardly of the lower frames, respectively, substantially parallel thereto, and a curved portion interconnecting the extensions, a pair of link mechanisms on which the front wheels are adapted to be supported, respectively, for vertical angular movement, the link mechanisms respectively including upper arms pivotally mounted on the respective extensions of the subframe, lower arms adapted to be pivotally mounted on the respective lower frames, and knuckle arms supported by the upper and lower arms, and a pair of dampers adapted to be mounted on the vehicle frame and supporting the link mechanisms, respectively.

3 Claims, 6 Drawing Figures

4,662,467

FRONT WHEEL SUSPENSION FOR A MOTOR VEHICLE WITH RIDING SADDLE

BACKGROUND OF THE INVENTION

The present invention relates to a front wheel suspension for use in a motor vehicle with a riding saddle.

More vehicles with riding saddles are primarily used to travel over rough terrain. Such motor vehicles generally include a vehicle frame comprising a pair of upper frames which are spaced transversely and extend longitudinally, and a pair of lower frames which are spaced transversely and extend longitudinally, the vehicle frame supporting two front wheels and two rear wheels rotatably thereon.

As disclosed in Japanese Laid-Open Patent Publication No. 59(1984)-89281, each of the front wheels is heretofore supported by a front wheel suspension including a knuckle arm supported by front and rear support arms pivotally attached to the lower frame, the knuckle arm being suspended by a damper attached to the vehicle frame.

In the prior front wheel suspension, the knuckle arm is supported by the front and rear support arms which lie in a plane. With this arrangement, increased mechanical strength and rigidity of the front wheel suspension and the vehicle frame portion which supports the front wheel suspension have resulted in an increased overall weight.

SUMMARY OF THE INVENTION

It is an object of the present invention to provide a front wheel suspension for use in motor vehicles with riding saddles which allows the vehicle frame to be lightweight and compact while increasing the mechanical strength and rigidity of the front wheel suspension and the vehicle frame portion which supports the front wheel suspension.

According to the present invention, a front wheel suspension for a motor vehicle including a vehicle frame having a pair of upper frames which are spaced transversely and extend longitudinally and a pair of lower frames which are spaced transversely and extend longitudinally, each of the upper frames having a downward portion extending from a front portion thereof and having a lower end fixed to one of the lower frames, front and rear wheels rotatably disposed on front and rear portions of the vehicle frame, a rider's saddle disposed on the upper frames, and footsteps supported on the lower frames, the front wheel suspension comprising a subframe adapted to be attached to the vehicle frame and having a pair of extensions adapted to be disposed upwardly of the lower frames, respectively, substantially parallel thereto, and a curved portion interconnecting the extensions, a pair of link mechanisms on which the front wheels are adapted to be supported, respectively, for vertical angular movement, the link mechanisms respectively including upper arms pivotally mounted on the respective extensions of the subframe, lower arms adapted to be pivotally mounted on the respective lower frames, and knuckle arms supported by the upper and lower arms, and a pair of dampers adapted to be mounted on the vehicle frame and supporting the link mechanisms, respectively.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

The principles of the present invention are particularly useful when embodied in a front wheel suspension incorporated in a motor vehicle with a riding saddle.

Figure 1:
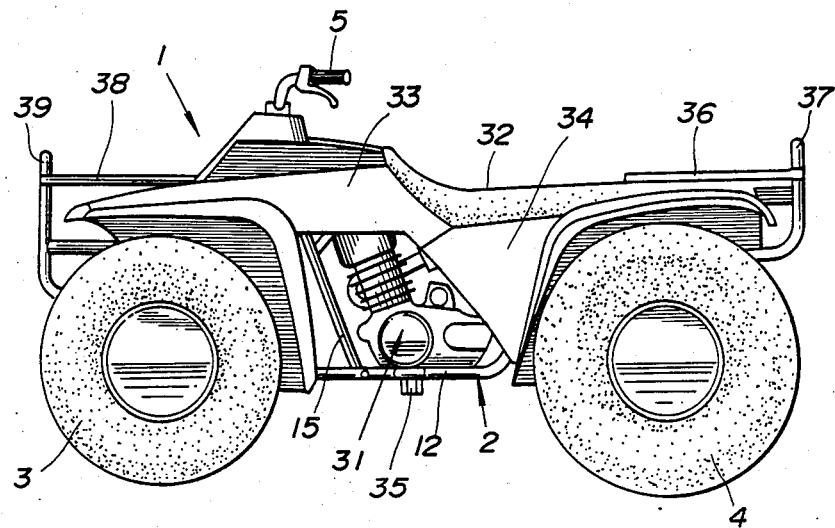
FIG. 1 is a side elevational view of a motor vehicle with a riding saddle.
Figure 2:
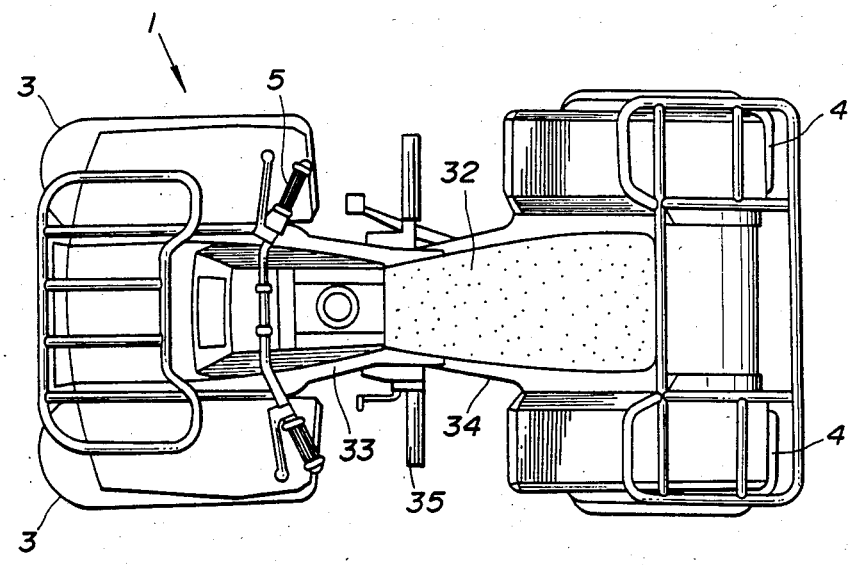
FIG. 2 is a plan view of the motor vehicle shown in FIG. 1.

As shown in FIGS. 1 and 2, a four-wheeled motor vehicle 1 with a riding saddle has a vehicle frame 2 on which two front wheels 3, 3 and two rear wheels 4, 4 are rotatably mounted, the front wheels 3, 3 being steerable by a handlebar 5. Each of the front and rear wheels 3, 4 has a balloon tire having a large width and filled with air under a low pressure ($0.2$ $Kg/cm^2$).

Figure 3:
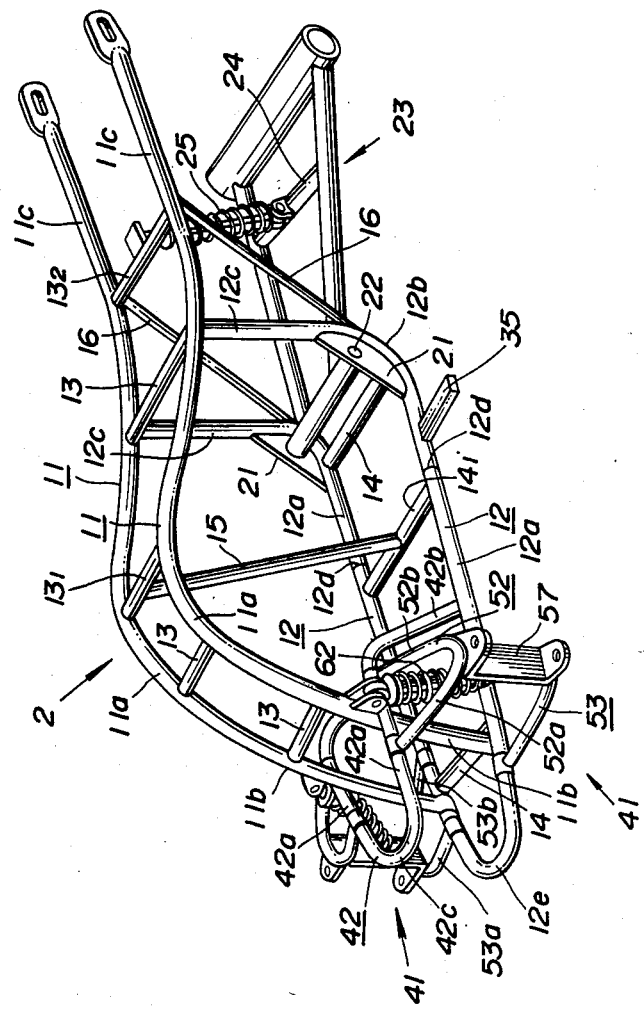
FIG. 3 is a perspective view of a vehicle frame.

As shown in FIG. 3, the vehicle frame 2 comprises a pair of upper pipe frames 11, 11 which are spaced transversely and extend longitudinally and a pair of lower pipe frames 12, 12 which are spaced transversely and extend longitudinally.

Each of the upper pipe frames 11 comprises a curved portion 11a extending forwardly from a substantially intermediate portion and curved with a large curvature, a downward portion 11b extending obliquely downwardly from the front portion of the curved portion 11a, and a rear extension 11c extending rearwardly from the rear portion of the curve portion 11a. Cross members 13 are coupled between the upper frames 11, 11 at longitudinally spaced intervals.

Each of the lower pipe frames 12 comprises a front extension 12a extending longitudinally and an upstanding portion 12c extending vertically from the rear end of the front extension 12a through a bent portion 12b. Each lower pipe frame 12 is made of two pipes welded end to end at an intermediate portion 12d. The lower pipe frames 12, 12 have front ends connected to each other by a U-bent portion 12e. Cross members 14 are coupled between the lower piper frames 12, 12 at longitudinal intervals. One $13_1$ of the cross members 13 which is positioned at an intermediate portion of the curved portions 11a is connected by a vertical frame 16 to one $14_1$ of the cross members which is positioned near the intermediate portions 12d. Seat stays 16 are joined between intermediate portions of the rear extensions 11c and the bent portions 12b.

To the bent portions 12b, 12b, there are attached gusset plates 21, 21 between which a support shaft 22 is attached. The rear wheels 4, 4 are supported by a swing arm 23 having a front end pivotaly mounted on the support shaft 22. A damper 25 is coupled between a cross member $13_2$ of the upper frames 11 and a cross member 24 of the swing arm 23. Therefore, the rear wheels 4, 4 are vertically angularly movably supported on the swing arm 23.

An engine 31 is disposed in a space defined by the vertical frame 15, the upper frames 11, the upstanding portions 12c, and the front extensions 12a. A rider's seat or saddle 32 is disposed on the upper frames 11. The vehicle frame 2 is covered with a front cover 33 and a rear cover 34, as shown in FIGS. 1 and 2.

Footsteps 35 are attached to the lower frames 12 below the engine 31. A rear carrier 36 and a rear bumper 37 which are joined to each other are fixed to the extensions 11c of the upper frames 11 behind the rider's saddle 32. A front carrier 38 and a front bumper 39 which are joined to each other are disposed in front of the handle bar 5.

The front wheels 3 are supported by respective front wheel suspensions 41 (FIG. 3) mounted on the lower portions of the downward portions 11b and the front portions of the front extensions 12a. As illustrated in FIG. 3, the front wheel suspensions 41 comprise a subframe 42 including a pair of laterally spaced extensions 42a spaced from and extendng substantially parallel to the front extensions 12a, and a pair of inclined portions 42b extending obliquely downwardly from the rear ends of the extensions 42a. Each extension 42a has an intermediate portion welded to the downward portion 11b. Each inclined portion 42b has a lower end welded to the front extension 14a. The laterally spaced extensions 42a, 42b are interconnected at their front ends by a curved portion 42c.

Figure 4:
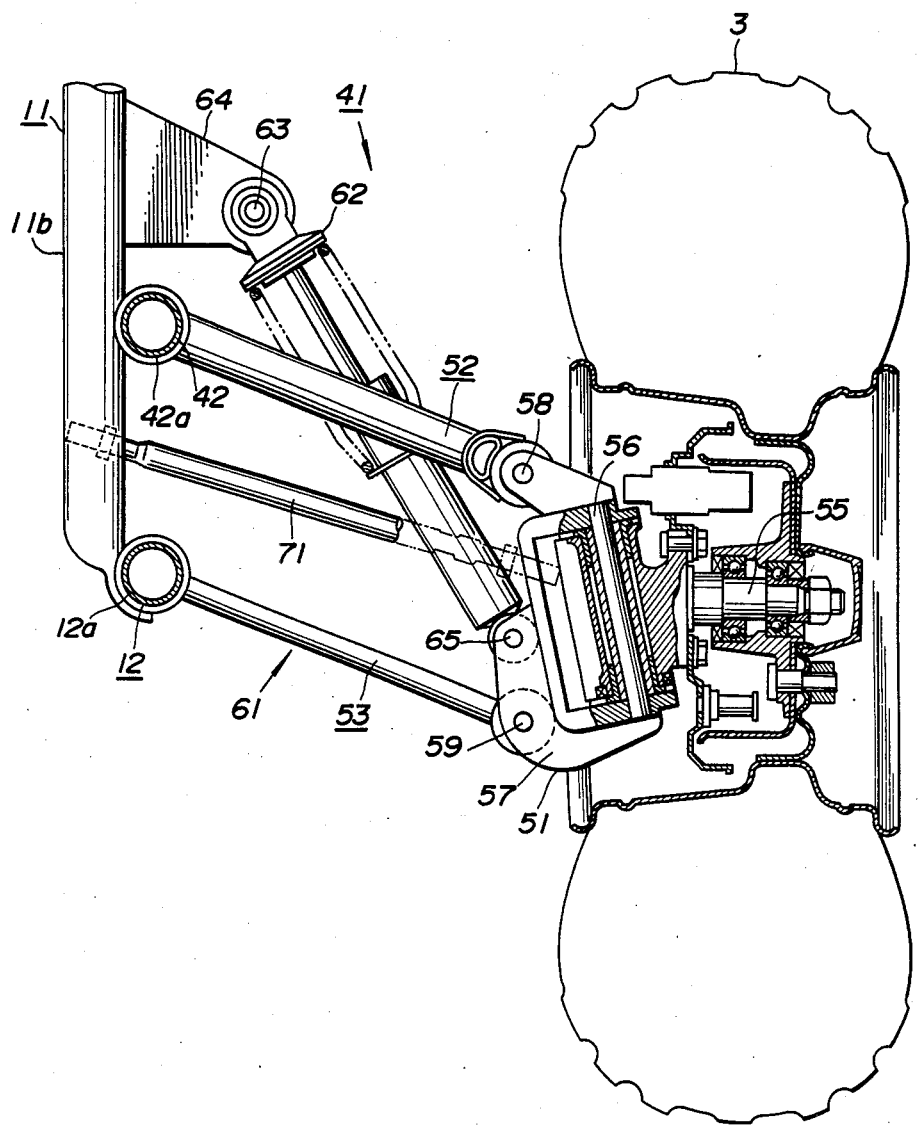
FIG. 4 is an enlarged front elevational view, partly in cross section, of a front wheel suspension.

As shown in FIG. 4, a knucle arm 51 mounted on each of the front wheels 3 is supported by an upper arm 52 pivotally mounted on the extension 42a of the subframe 42 and a lower arm 53 pivotally mounted on the extension 12a of the lower frame 12. As shown in FIG. 3, the upper arm 52 is of a bifurcated configuration having front and rear members 52a, 52b interconnected at distal ends thereof, and the lower arm 53 is also of a bifurcated configuration having front and rear members 53a, 53b interconnected at distal ends thereof. The downward portion 11b is positioned between the ends of the front and rear members 52a, 52b which are pivotally connected to the extension 42a and also between the ends of the front and rear members 53a, 53b which are pivotally connected to the extension 12a.

The knuckle arm 51 has an axle 55 on which the front wheel 3 is rotatably supported, a kingpin 56 supporting the axle 55, and a holder 57 supporting the kingpin 56. The distal ends of the upper arm 52 and the lower arm 53 are rotatably coupled to the holder 57 through pivot shafts 58, 59, respectively.

The upper arm 52, the knuckle arm 51, and the lower arm 53 jointly constitute a link mechanism 61 by which the front wheel 3 is supported for vertical angular movement. The link mechanism 61 is suspended by a damper 62 attached to the vehicle frame 2. In the illustrated embodiment, the damper 62 has an upper end pivotally mounted on the downward portion 11b by a bracket 64, an intermediate position positioned between the front and rear members 52a, 52b of the upper arm 52, and a lower end pivotally mounted on the holder 57 by a pivot shaft 65. The front wheel 3 can be steered by a steering mechanism including a tie rod 71.

Since the front wheel 3 is supported by the upper and lower arms 52, 53 which are vertically spaced, the front wheel suspension 51 has an increased degree of mechanical strength and rigidity.

The portion of the vehicle frame 2 which supports the upper arm 52 and the lower arm 53 includes the inclined portion 42b, the extensions 12a, 42a, and the downward portion 11b, which jointly form a closed four-sided framework shape as seen transversely of the vehicle frame 2. Therefore, this portion of the vehicle frame 2 is of high mechanical strength and rigidity and can support the link mechanism 61 with increased stability. The portions of the vehicle frame 2 which support the upper and lower arms 52, 53 of the front wheel suspension 41, 41 are interconnected for increased mechanical strength and rigidity by the curved portions 12e, 42c which cooperate with the downward portions 11b, 11b and the inclined portions 42b in forming a closed four-sided framework shape as seen longitudinally of the vehicle frame 2.

The front wheel suspensions 41, 41 utilize as their members the downward portions 11b extending from the curved portions 11a of a large curvature. The upper frames 11 having such curved portions 11a are of required mechanical strength, and can be constructed of a reduced number of parts, with the result that the vehicle frame 2 is compact and lightweight.

Figure 5:
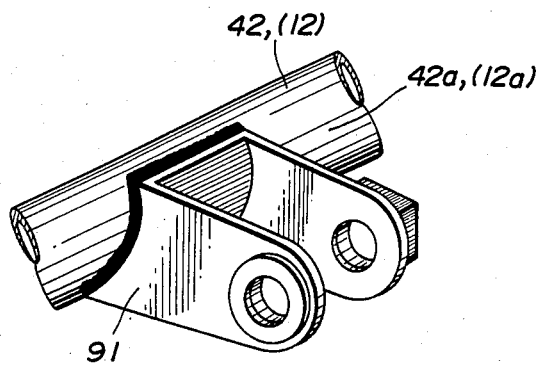
FIG. 5 is a perspective view of a bracket according to another embodiment of the present invention.
Figure 6:
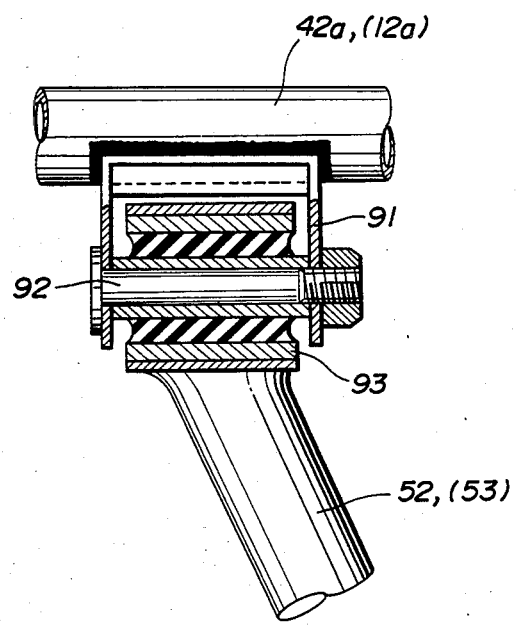
FIG. 6 is a plan view, partly in cross section, of the bracket shown in FIG. 5.

FIGS. 5 and 6 show a second embodiment of the present invention. A bracket 91 is fixed to each of the extensions 42a of the subframe 42 and each of the extensions 12a of the lower frames 12. The upper and lower arms 52, 53 are pivotally mounted on the subframes 42 and the lower frames 12 by a pivot shaft 92 attached to the bracket 91 and a rubber bushing 93 rotatably mounted on the pivot shaft 92.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A front wheel suspension for a motor vehicle including a vehicle frame having a pair of upper frames which are spaced transversely and extend longitudinally and a pair of lower frames which are spaced transversely and extend longitudinally, each of said upper frames having a downward portion extending from a front portion thereof and having a lower end fixed to one of said lower frames, front and rear wheels rotatably disposed on front and rear portions of said vehicle frame, a rider's saddle disposed on said upper frames, and footsteps supported on said lower frames, said front wheel suspension comprising:

a subframe adapted to be attached to said vehicle frame and having a pair of extensions adapted to be disposed upwardly of said lower frames, respectively, substantially parallel thereto, and a curved portion interconnecting said extensions;

a pair of link mechanisms on which said front wheels are adapted to be supported, respectively, for vertical angular movement, said link mechanisms respectively including upper arms pivotally mounted on the respective extensions of said subframe, lower arms adapted to be pivotally mounted on the respectively lower frames, and knuckle arms supported by said upper and lower arms;

a pair of dampers adapted to be mounted on said vehicle frame and supporting said link mechanisms, respectively; and a pair of inclined portions of said subframe extending from said extensions, respectively, and adapted to be connected to be connected to said lower frames, respectively.

2. A front wheel suspension according to claim 1, wherein each of said knuckle arms comprises an axle on which one of said front wheels is adapted to be rotatably supported, a kingpin supporting said axle, and a holder supporting said kingpin.

3. A front wheel suspension for a motor vehicle including a vehicle frame having a pair of upper frames which are spaced transversely and extend longitudinally and a pair of lower frames which are spaced transversely and extend longitudinally, each of said upper frames having a downward portion extending from a front portion thereof and having a lower end fixed to one of said lower frames, front and rear wheels rotatably disposed on front and rear portions of said vehicle frame, a rider's saddle disposed on said upper frames, and footsteps supported on said lower frames, said front wheel suspension comprising:

a subframe adapted to be attached to said vehicle frame and having a pair of extensions adapted to be disposed upwardly of said lower frames, respectively, substantially parallel thereto, and a curved portion interconnecting said extensions;

a pair of link mechanisms on which said front wheels are adapted to be supported, respectively, for vertical angular movement, said link mechanisms respectively including upper arms pivotally mounted on the respective extensions of said subframe, lower arms adapted to be pivotally mounted on the respective lower frames, and knuckle arms supported by said upper and lower arms;

a pair of dampers adapted to be mounted on said vehicle frame and supporting said link mechanisms, respectively; and said subframe and said lower frame having brackets, pivot shafts mounted respectively on said brackets, and rubber bushings rotatably mounted on said pivot shafts, said upper and lower arms being pivotally mounted on said subframe and adapted to be pivotally mounted on said lower frames by said brackets, said pivot shafts, and said rubber bushings.

* * * * *